United States Patent
Liu et al.

(10) Patent No.: US 10,097,023 B2
(45) Date of Patent: Oct. 9, 2018

(54) CHARGE WAKE-UP CIRCUIT FOR A BATTERY MANAGEMENT SYSTEM

(71) Applicant: Heifei University of Technology, Hefei-Anhui (CN)

(72) Inventors: Xintian Liu, Heifei (CN); Yao He, Hefei (CN); Guojian Zeng, Hefei (CA); Xinxin Zheng, Hefei (CN)

(73) Assignee: Heifei University of Technology (CN)

( * ) Notice: Subject to any disclaimer, the term of this patent is extended or adjusted under 35 U.S.C. 154(b) by 52 days.

(21) Appl. No.: 15/096,890

(22) Filed: Apr. 12, 2016

(65) Prior Publication Data
US 2017/0025877 A1 Jan. 26, 2017

(30) Foreign Application Priority Data
Jul. 23, 2015 (CN) .......................... 2015 1 0444247

(51) Int. Cl.
*H01M 10/46* (2006.01)
*H02J 7/00* (2006.01)

(52) U.S. Cl.
CPC .......... *H02J 7/0068* (2013.01); *H02J 7/0072* (2013.01)

(58) Field of Classification Search
CPC ....... H02J 7/0021; H02J 7/0026; H02J 7/0047
USPC ................................. 320/107, 127, 128, 132
See application file for complete search history.

(56) References Cited

U.S. PATENT DOCUMENTS

| | | | | |
|---|---|---|---|---|
| 5,606,242 A | * | 2/1997 | Hull ...................... | H02J 7/0004 320/106 |
| 2015/0180257 A1 | * | 6/2015 | Snyder ................ | H01M 10/441 320/103 |
| 2015/0380978 A1 | * | 12/2015 | Toivola ................... | H02J 7/025 320/108 |
| 2016/0181846 A1 | * | 6/2016 | Stirk .................. | G01R 31/3675 320/134 |

* cited by examiner

*Primary Examiner* — Edward Tso
(74) *Attorney, Agent, or Firm* — Dickinson Wright PLLC

(57) ABSTRACT

A charge wake-up circuit for Battery Management System (BMS). The circuit includes the charge-discharge module and charge detection module. The charge-discharge module contains Charger W, load R1, first switch K1, second switch K2, battery E, charge MOSFET M1 and discharge MOSFET M2. The charge detection module contains inductance L 1, first diode D1, second diode D2, first resistor R2, second resistor R3, third resistor R4, fourth resistor R5, fifth resistor R6, sixth resistor R7, seventh resistor R8, first capacitor C1, second capacitor C2, third capacitor C3, first transistor Q1, second transistor Q2 and photocoupler U.

1 Claim, 1 Drawing Sheet

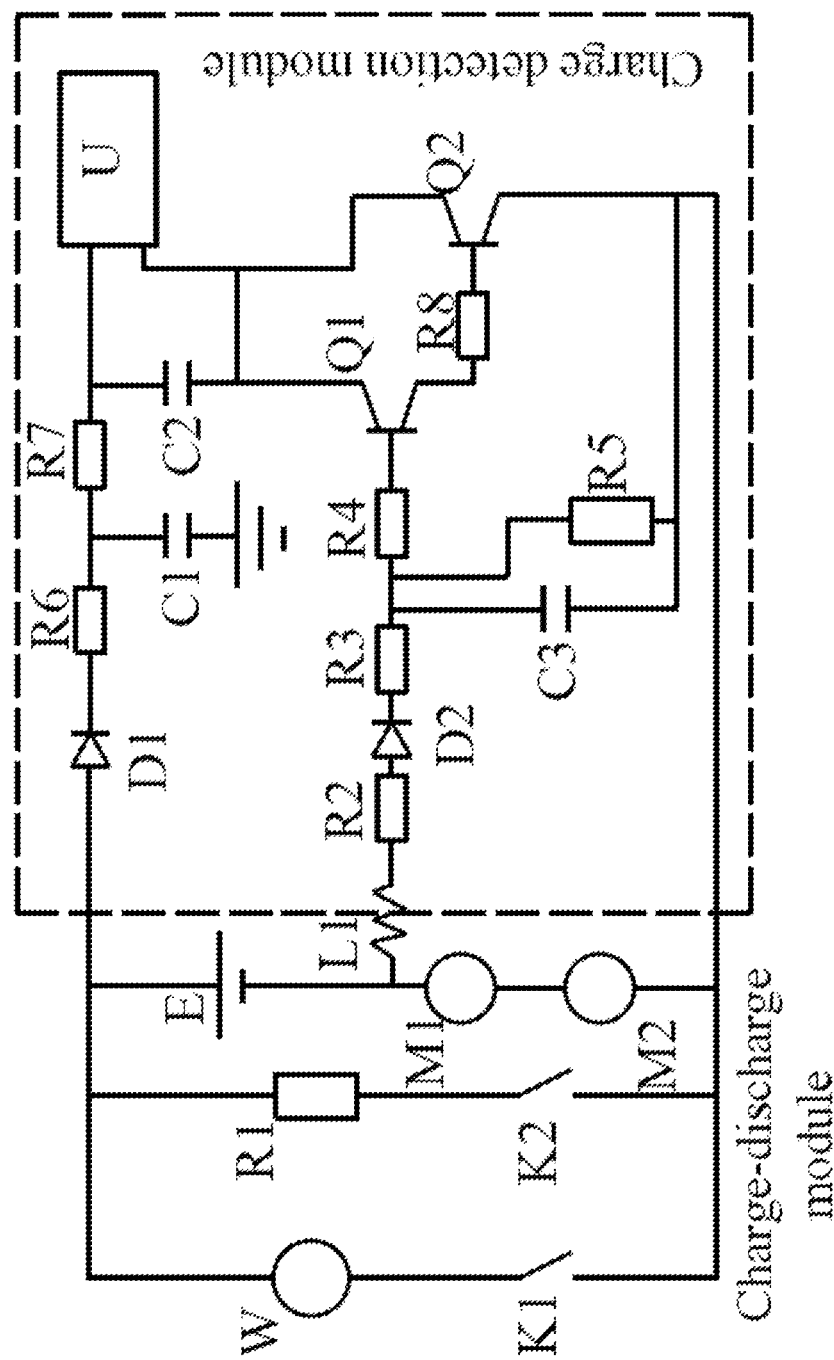

CHARGE WAKE-UP CIRCUIT FOR A BATTERY MANAGEMENT SYSTEM

CROSS-REFERENCE TO RELATED APPLICATIONS

The present invention is related to, and claims the benefit of priority from, Chinese Patent Application 201510444247.7, filed 23 Jul. 2015, the disclosure of which application is incorporated herein by reference in its entirety.

FIELD OF THE INVENTION

This invention relates to a charge wake-up circuit for Battery Management System.

BACKGROUND

A battery management system ("BMS") stops a Li-ion battery pack from output after the battery is over discharge. However, the BMS is powered by the Li-ion battery, thus, the continued work of the BMS will hurt the battery without timely charging in the state of discharge. Ordinarily, the customer should cut the BMS manually, while the intelligent BMS will detect the charger in the state of discharge, if the charger is not connected, the BMS will cut itself to reduce power consumption. And if the charger is detected in the power-off state, the BMS will be restarted. The BMS wake-up circuit is required to restart the BMS when detecting the charger in charging the battery pack.

The regular method is spanning the sampling circuit between the battery anode P+ and cathode P−, or connecting a detection circuit at both ends of the charging MOSFET to wake up the BMS. However, the first one is always in working condition and costs much power of the battery; and the second one demands on voltage sharply, the bad voltage or current will burn the detection circuit.

Connecting photocoupler directly to both ends of the charger is also a common charging detection circuit. This detection circuit is very simple with poor withstand capability. In addition, it costs power when the charger is offline and damages the battery pack. Connecting a detection circuit reversely to both ends of the charge relay is another choice. However, this circuit is hard to control and easy to burn itself.

SUMMARY OF THE DISCLOSURE

Aiming at the deficiencies of the prior technology, a new technical solution is proposed in this application. This invention is proposed as follows: A charge wake-up circuit for a BMS includes the charge-discharge module and charge detection module with the features as: the charge-discharge module contains Charger W, load R1, first switch K1, second switch K2, battery E, charge MOSFET M1 and discharge MOSFET M2; and the charge detection module contains inductance L1, first diode D1, second diode D2, first resistor R2, second resistor R3, third resistor R4, fourth resistor R5, fifth resistor R6, sixth resistor R7, seventh resistor RS, first capacitor C1, second capacitor C2, third capacitor C3, first transistor Q1, second transistor Q2 and photocoupler U.

The Charger W and first switch K1 form a series branch, the load R1 and second switch K2 form another series branch, and the charge MOSFET M1 and discharge MOSFET M2 form the third series branch. The above three series branches are in parallel to form the charge-discharge module.

The anode of first diode D1 is connected to the anode of battery E, the cathode of first diode D1 is connected to fifth resistor R6, and the fifth resistor is connected to both sixth resistor R7 and first capacitor C1, the first capacitor C1 is connected to the ground. The sixth resistor R7 connected to second capacitor C2 and photocoupler U, another port of second capacitor C2 and photocoupler U form the common port to be connected to the collector of first transistor Q1 and second transistor Q2, the emitter of first transistor Q1 is connected to the base of second transistor Q2 through seventh resistor RS, the emitter of second transistor Q2 is connected third capacitor C3 and fourth resistor R5, another port of third capacitor C3 and fourth resistor R5 forms the second common port, and the second common port is connected to second resistor R3 and third resistor R4. The third resistor R4 is connected to the base of first transistor Q1, the second resistor R3 is connected to the cathode of second diode D2, the anode of second diode D2 is connected to first resistor R2, the first resistor R2 is connected to inductance L1, and the inductance L1 is connected to the cathode of battery E.

The structure of the invention is simple and reasonable, and the wide work voltage can be realized from adjusting the input resistor and the limiting resistor of the collector of the transistor to adapt to different voltage platforms. Besides, the invention is low-power. When the charger is offline, the charge MOSFET and discharge MOSFET will be shut down, so the circuit will not work to reduce the power consumption. Moreover, the circuit is cheap and economical.

BRIEF DESCRIPTION OF THE DRAWINGS

FIG. 1 is the circuit of the charge wake-up circuit for BMS.

WRITTEN DESCRIPTION

A charge wake-up circuit for BMS includes the charge-discharge module and charge detection module with the features as: the charge-discharge module contains Charger W, load R1, first switch K1, second switch K2, battery E, charge MOSFET M1 and discharge MOSFET M2; and the charge detection module contains inductance L1, first diode D1, second diode D2, first resistor R2, second resistor R3, third resistor R4, fourth resistor R5, fifth resistor R6, sixth resistor R7, seventh resistor RS, first capacitor C1, second capacitor C2, third capacitor C3, first transistor Q1, second transistor Q2 and photocoupler U.

The Charger W and first switch K1 form a series branch, the load R1 and second switch K2 form another series branch, and the charge MOSFET M1 and discharge MOSFET M2 form the third series branch. The above three series branches are in parallel to form the charge-discharge module.

The anode of first diode D1 is connected to the anode of battery E, the cathode of first diode D1 is connected to fifth resistor R6, and the fifth resistor is connected to both sixth resistor R7 and first capacitor C1, the first capacitor C1 is connected to the ground. The sixth resistor R7 connected to second capacitor C2 and photocoupler U, another port of second capacitor C2 and photocoupler U form the common port to be connected to the collector of first transistor Q1 and second transistor Q2, the emitter of first transistor Q1 is connected to the base of second transistor Q2 through seventh resistor RS, the emitter of second transistor Q2 is connected third capacitor C3 and fourth resistor R5, another port of third capacitor C3 and fourth resistor R5 forms the second common port, and the second common port is connected to second resistor R3 and third resistor R4. The third resistor R4 is connected to the base of first transistor Q1, the second resistor R3 is connected to the cathode of second diode D2, the anode of second diode D2 is connected to first resistor R2, the first resistor R2 is connected to inductance L1, and the inductance L1 is connected to the cathode of battery E.

When the low-side high current switch which is first switch K1 is not shut down, the circuit is powered by the charger W. When the voltage difference between the charger and battery pack satisfy the open condition, the photocoupler will open.

The voltage difference of battery pack $\Delta U = U_{chg} - U_{BAT}$, the parameter $\Delta U$ is the input of the detection circuit to turn on the transistor.

The third resistor R4 and forth resistor R5 provide the bias voltage of the transistor, and the third capacitor C3 is the filter capacitor to filter the external interference. The transistor Q1 and transistor Q2 compose the Darlington tube to bear a wider voltage range of the $\Delta U$. The fifth resistor R6 and sixth resistor R7 are limiting resistors to stop the photocoupler from burning because of the high work current.

The structure of the invention is simple and reasonable, and the wide work voltage can be realized from adjusting the input resistor and the limiting resistor of the collector of the transistor to adapt to different voltage platforms. Besides, the invention is low-power. When the charger is offline, the charge MOSFET and discharge MOSFET will be shut down, so the circuit will not work to reduce the power consumption. Moreover, the circuit is cheap and economical.

The invention in which an exclusive property or privilege is claimed is defined as follows:

1. A charge wake-up circuit for a battery management system ("BMS"), comprising: a charge-discharge module including a charger, a load, at least first and second switches, a battery, a charge MOSFET, and a discharge MOSFET, wherein the charger and the first switch form a first series branch, the load and the second switch form a second series branch, and the charge MOSFET and discharge MOSFET form a third series branch, and wherein further the three series branches are in parallel to form the charge-discharge module; and a charge detection module including an inductance, a first diode, a second diode, a plurality of resistors, at least first, second and third capacitors, at least first and second transistors, and a photocoupler, wherein an anode of the first diode is connected to the anode of the battery, a cathode of the first diode is connected to a fifth one of the plurality of resistors, the fifth one of the plurality of resistors is connected to both a sixth one of the plurality of resistors and the first capacitor, the first capacitor is connected to ground, the sixth one of the plurality of resistors is connected to the second capacitor and the photocoupler, a port of the second capacitor and the photocoupler form a common port to be connected to the collector of the first transistor and the second transistor, an emitter of the first transistor is connected to a base of the second transistor through a seventh one of the plurality of resistors, an emitter of the second transistor is connected the third capacitor and a fourth one of the plurality of resistors, a port of the third capacitor and the fourth one of the plurality of resistors forms a second common port which is connected to a second one of the plurality of resistors and a third one of the plurality of resistors, the third one of the plurality of resistors is connected to the base of the first transistor, the second one of the plurality of resistors is connected to a cathode of the second diode, an anode of the second diode is connected to a first one of the plurality of resistors, the first one of the plurality of resistors is connected to an inductance, and the inductance is connected to a cathode of the battery.

* * * * *